(12) United States Patent
Kim

(10) Patent No.: US 9,228,287 B2
(45) Date of Patent: Jan. 5, 2016

(54) DRUM TYPE WASHING MACHINE AND TILTING METHOD OF THE SAME

(71) Applicant: Dongbu Daewoo Electronics Corporation, Seoul (KR)

(72) Inventor: Hye Ung Kim, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 91 days.

(21) Appl. No.: 14/099,862

(22) Filed: Dec. 6, 2013

(65) Prior Publication Data

US 2015/0122967 A1    May 7, 2015

(30) Foreign Application Priority Data

Nov. 6, 2013 (KR) .................. 10-2013-0134410

(51) Int. Cl.
| | | |
|---|---|---|
| F16M 13/00 | (2006.01) | |
| D06F 37/30 | (2006.01) | |
| D06F 23/02 | (2006.01) | |
| D06F 37/22 | (2006.01) | |
| F16M 13/02 | (2006.01) | |
| D06F 39/12 | (2006.01) | |
| D06F 37/26 | (2006.01) | |

(52) U.S. Cl.
CPC .............. *D06F 37/302* (2013.01); *D06F 23/02* (2013.01); *D06F 37/225* (2013.01); *D06F 37/267* (2013.01); *D06F 39/12* (2013.01); *F16M 13/022* (2013.01)

(58) Field of Classification Search
CPC .. F16M 13/022; D06F 37/302; D06F 37/225; D06F 23/02

USPC .................. 248/550; 68/23.1, 24; 8/137, 159
See application file for complete search history.

(56) References Cited

U.S. PATENT DOCUMENTS

| | | | | |
|---|---|---|---|---|
| 2,296,259 | A * | 9/1942 | Breckenridge | 68/24 |
| 5,090,220 | A * | 2/1992 | Fukuzawa et al. | 68/3 R |
| 2003/0140427 | A1* | 7/2003 | Yamamoto et al. | 8/159 |
| 2004/0040344 | A1* | 3/2004 | Minayoshi et al. | 68/12.16 |
| 2004/0221624 | A1 | 11/2004 | Fumagalli | |
| 2004/0244121 | A1* | 12/2004 | Lim et al. | 8/159 |
| 2006/0016228 | A1* | 1/2006 | Chang et al. | 68/23.1 |
| 2007/0056327 | A1* | 3/2007 | Oh | 68/3 R |
| 2007/0151042 | A1* | 7/2007 | Bringewatt et al. | 8/158 |
| 2009/0183318 | A1* | 7/2009 | Kim et al. | 8/159 |
| 2011/0041260 | A1* | 2/2011 | Balinski et al. | 8/159 |
| 2012/0151685 | A1* | 6/2012 | Jang et al. | 8/137 |
| 2012/0151688 | A1* | 6/2012 | Jang et al. | 8/137 |
| 2012/0192362 | A1* | 8/2012 | Lee et al. | 8/137 |
| 2013/0042492 | A1* | 2/2013 | Nishimura et al. | 34/108 |

FOREIGN PATENT DOCUMENTS

| | | |
|---|---|---|
| DE | 10339604 | 10/2004 |
| EP | 0437747 | 12/1990 |
| KR | 10-2010-0120050 | 11/2010 |

* cited by examiner

*Primary Examiner* — Mark Wendell

(57) ABSTRACT

Disclosed is a drum type washing machine, including a housing; a tub in the housing and having an opening; a drum in the tub; a rotary driving member in the housing configured to provide motive power to the drum and/or to rotate the drum; a tilting driving member between a side wall of the tub and the housing to provide the motive power to tilt the tub; and one or more damping members between the side wall of the tub and the housing to support the tub. The damping member(s) can be varied by tilting the tub.

17 Claims, 5 Drawing Sheets

DRUM TYPE WASHING MACHINE AND TILTING METHOD OF THE SAME

CROSS-REFERENCE TO RELATED APPLICATIONS

This application is based on and claims priority from Korean Patent Application No. 10-2013-0134410, filed on Nov. 6, 2013, with the Korean Intellectual Property Office, the disclosure of which is incorporated herein in its entirety by reference.

TECHNICAL FIELD

The present disclosure relates to a drum type washing machine, and more particularly, to a drum type washing machine including a tiltable tub.

BACKGROUND

In general, washing machines may be classified into agitation type washing machines in which washing is performed by an agitator at the center of a washing tub, pulsator type washing machines in which washing is performed by water flows and/or pulses generated by rotating a disk-like pulsator, and drum type washing machines in which washing is performed by rotation of a drum therein.

In the case of a drum type washing machine, detergent, washing water, and laundry are rotated by a motive power device (e.g., a motor) that rotates the drum while the detergent, the washing water, and the laundry are in the drum. The laundry can be effectively washed by a friction force between the washing water and the laundry, as lifters in the rotating drum lift the laundry out of the washing water, and the laundry falls back into the washing water.

However, in the case of the drum type washing machine, the rotation shaft or axis of the drum is in parallel to the floor and/or a top surface of the drum type washing machine. The rotation shaft is supported internally, and as a result, in the case of a washing machine that has an opening below the user's waist, the user typically puts the laundry in or withdraws the laundry from the drum by bending his/her waist and back, but extending his/her arms parallel to the ground.

The user fatigue degree may increase and/or the user may feel some pain when the user withdraws large, damp laundry such as a quilt or blanket from the drum by bending his/her waist and back, and extending his/her arms in such a manner.

SUMMARY

The present disclosure has been made in an effort to provide a drum type washing machine including a tiltable tub.

One or more exemplary embodiments of the present disclosure provide a drum type washing machine, including a housing; a tub in the housing and having an opening; a drum in the tub; a rotary driving member in the housing, configured to provide motive power to the drum and/or to rotate the drum; a tilting driving member between a side wall of the tub and the housing, configured to provide motive power to an end of the tub and/or to tilt the tub; and one or more damping members between the side wall of the tub and the housing that support the tub and are varied by tilting the tub. The tilting driving member may be between a lowermost surface of the tub and a floor of the housing, and is configured to tilt the opening of the tub upward. In one embodiment, the tilting driving member contacts a front part of the tub nearest to the opening, and is configured to move or push the front part of the tub up.

The drum type washing machine may further include a control unit configured to detect actuation of the rotary driving member and/or rotation of the drum, and control the tilting driving member to tilt the opening of the tub upward when the rotary driving member is not actuated and/or the drum is not rotating.

One or more other exemplary embodiments of the present disclosure provide a drum type washing machine, including a housing; a tub in the housing and having an opening; a drum in the tub; a door over and/or facing the opening, at one side of the housing; a tilting driving member between the tub and the housing, configured to provide motive power to an end of the tub and/or to tilt the tub; one or more damping members between a side wall of the tub and the housing that support the tub and are varied by tilting the tub; and a control unit configured to detect when the door is open, and control the tilting driving member to tilt the opening of the tub upward when the door is open.

The tilting driving member may have one end connected (e.g., pivotally connected) to an outer peripheral surface of the tub and another end on the housing (e.g., a floor of the housing), and the one end of the tilting driving member may be extended by internal fluid pressure. For example, the tilting driving member may comprise a hydraulic piston or cylinder.

The damping member may include a first damping portion coupled (e.g., pivotally coupled) to the outer peripheral surface of the tub; a second damping portion coupled (e.g., pivotally coupled) to the housing; and a hinge foldably or pivotally coupling the first damping portion and the second damping portion.

The drum type washing machine may comprise a plurality of damping members around (e.g., on opposite sides of) the tilting driving member.

The hinge of each damping member may be away from the tilting driving member and/or the damping member(s) on the opposite side of the tilting driving member. In one embodiment, the hinge of each damping member is away from the tilting driving member and/or the damping member(s) on the opposite side of the tilting driving member when the opening of the tub is tilted upward.

The drum type washing machine may further include an auxiliary damping member including a tub rib on an outer peripheral surface of the tub; a housing rib inside the housing, facing one surface of the tub rib; and an elastic member between the tub rib and the housing rib.

According to exemplary embodiments of the present disclosure, in a drum type washing machine, a tub can be tilted to enable the user to effectively and/or more easily put laundry in the drum and/or take laundry out of the drum.

The foregoing summary is illustrative only and is not intended to be in any way limiting. In addition to the illustrative aspects, embodiments, and features described above, further aspects, embodiments, and features of the disclosure will become apparent by reference to the drawings and the following detailed description.

DETAILED DESCRIPTION

Figure 1:
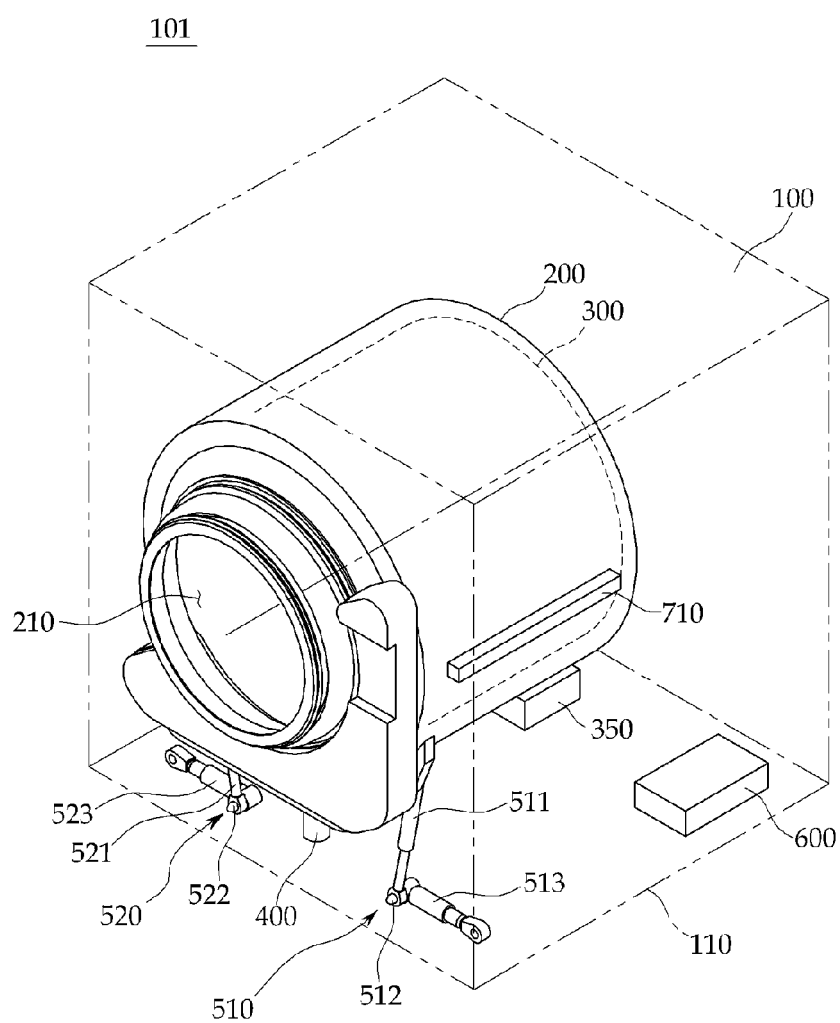
FIG. 1 is a diagram illustrating a drum type washing machine according to one or more exemplary embodiments of the present disclosure.

In the following detailed description, reference is made to the accompanying drawings, which form a part hereof. The illustrative embodiments described in the detailed description, drawings, and/or claims are not meant to be limiting. Other embodiments may be utilized, and other changes may be made, without departing from the spirit or scope of the subject matter presented here.

Exemplary embodiments of the present disclosure will be described more fully hereinafter with reference to the accompanying drawings, in which exemplary embodiments of the disclosure can be determined by those skilled in the art. As those skilled in the art may realize, the described exemplary embodiments may be modified in various different ways, all without departing from the spirit or scope of the present disclosure, and the spirit and/or scope of the present disclosure is not limited to the exemplary embodiments described herein.

In the disclosed exemplary embodiments, like reference numerals designate like elements having the same function and/or configuration. Consequently, one or more exemplary embodiments are representatively described, and in other exemplary embodiments, only a configuration and/or function different from the originally described exemplary embodiment(s) will be described.

It is noted that the drawings are schematic and are not necessarily dimensionally illustrated. Relative sizes and proportions of parts in the drawings may be exaggerated or reduced in their sizes, and any predetermined size is exemplary and not limiting. The same reference numerals designate the same structures, elements, or parts illustrated in multiple drawings in order to exhibit similar characteristics.

Exemplary embodiments of the present disclosure may illustrate ideal embodiments of the present disclosure in detail. As a result, various modifications of the drawings may be expected. Accordingly, the exemplary embodiments are not limited to a specific form of the illustrated structure, arrangement and/or region, and for example, include modifications of form by manufacturing.

Hereinafter, a drum type washing machine according to one or more exemplary embodiments of the present disclosure will be described with reference to FIGS. 1 to 3.

As illustrated in FIG. 1, a drum type washing machine 101 according to one or more exemplary embodiments of the present disclosure includes a housing 100, a tub 200, a drum 300, a rotary driving member 350, a tilting driving member 400, and damping members 510 and 520.

The housing 100 forms an exterior of the drum type washing machine 101. Components for operating the drum type washing machine 101 are installed in the housing 100.

The tub 200 is positioned in the housing 100. Washing water is supplied to the tub 200 by a water supply device (not illustrated), and the tub 200 contains the washing water.

In detail, the tub 200 may have a cylindrical or slightly conical shape, in which an opening 210 is at one side or end. Generally, opening 210 is at the front side or end of the tub, nearest to the door 120 (see FIG. 4).

Referring back to FIGS. 1-3, the drum 300 is housed in the tub 200. The drum 300 may also have a cylindrical or slightly conical shape so as to receive laundry. In detail, the drum 300 may have a central axis substantially in common with the center axis of the cylindrical tub 200 and be formed similarly to the cylindrical tub 200, but with holes or openings in the side wall to permit passage of water from the tub to the drum and vice versa.

That is, the drum 300 is in the cylindrical tub 200 and may have the same cylindrical shape to receive the laundry therein.

The rotary driving member 350 is provided inside the housing 100 to provide motive power to rotate the drum 300. In general, the rotary driving member 350 is fixed to the tub 200, and not to the housing 100, to enable the tilting movement of the tub 200.

In detail, the rotary driving member 350 is installed at one side or end of the tub 200 (e.g., the rear end of the tub 200, farthest away from the door 120), and transfers rotary force to the drum 300 through motive power transfer members that may include a pulley and a belt (not illustrated) to rotate a pulley wheel attached to the drum 300. Alternatively, the rotary driving member 350 is installed along a rotation shaft direction of the drum 300 to directly rotate the drum 300 without a power transfer member (e.g., a belt). As one example, the rotary driving member 350 may be a motor.

The tilting driving member 400 is provided between one side (e.g., the underside) of the tub 200 and the housing 100 (e.g., the floor of the housing) to provide motive power so as to tilt the tub 200. That is, the tilting driving member 400 is installed on a base or floor 110 of the housing 100 supporting the drum type washing machine 101 to provide the motive power to tilt the tub 200.

In detail, the tilting driving member 400 is provided between an outer peripheral surface (e.g., a lowermost surface) of the tub 200 and the base 110, and may be eccentrically adjacent to the opening 210 of the tub 200. That is, the tilting driving member 400 presses, pushes or lifts one side (e.g., the front side or end) along a longitudinal direction of the cylindrical tub 200 adjacent to the opening 210 to tilt the tub 200.

The damping members 510 and 520 are provided between one side (e.g., the underside) of the tub 200 and the housing 100 (e.g., the floor or base 110 of the housing), and dampen impact and/or vibrations that are generated by the washing water contained in the tub 200 while washing, and that are transferred to the housing 100. The damping members 510 and 520 according to exemplary embodiments of the present disclosure are varied by tilting the tub 200 by the tilting driving member 400.

That is, the damping members 510 and 520 may prevent the tub 200 from being damaged or broken due to vibrations generated when washing or spin-drying laundry when the drum 300 is rotated by the rotary driving member 350 and are transferred to the tub 200.

When the vibrations generated by the rotation of the drum 300 are transferred to the tub 200, the damping members 510 and 520 dampen vibration between the housing 100 and the tub 200 to prevent movement of the housing 100 and/or noise from being generated due to the vibrations. Accordingly, the damping members 510 and 520 may improve the life-span of the drum type washing machine 101 and reduce noise.

The damping members 510 and 520 may be varied (e.g., the positions and/or folding/bending angles thereof) when the tub 200 is tilted by the tilting driving member 400 to effectively support the tub 200 regardless of the tilt position of the tub 200. That is, the positions and/or folding or bending angles of damping members 510 and 520 may be effectively varied during the tilting of the tub 200 to effectively support the tub 200 and reduce the noise generated due to vibrations of the tub 200.

In detail, the damping members 510 and 520 extend in the tilting direction when the tub 200 is tilted, and the lengths and/or angles of the damping members 510 and 520 may vary according to the tilting direction.

The drum type washing machine 101 according to exemplary embodiments of the present disclosure may further include a control unit 600.

The control unit 600 detects the actuation of the rotary driving member 350, and when the rotary driving member 350 is not operating (e.g., actuation of the rotary driving member 350 is stopped), the control unit 600 may control the tilting driving member 400 to tilt the tub 200. That is, the control unit 600 may control the tilting driving member 400 and tilt the tub 200 by detecting the actuation of the rotary driving member 350 from a sensor or an rpm detecting device of, on or in the rotary driving member 350. Alternatively, the control unit 600 may detect or sense rotation of the drum 300 using a motion sensor installed in the tub 200, and/or detect water in the tub 200 using a water level detector installed on the tub 200, and tilt the tub 200 only when the drum 300 is not rotating and/or there is no water in the tub 200.

In detail, the control unit 600 may control the tilting driving member 400 so that the tub 200 and/or the opening 210 of the tub 200 tilts upward when the rotary driving member 350 is not actuated, the drum 300 is not rotating and/or there is no water in the tub 200.

That is, when the tub 200 is tilted so that the opening 210 faces upward, the user may withdraw and put in laundry without severely bending his/her waist and back at the time of putting the laundry in and/or taking the laundry from the drum 300. The user also is not required to raise his/her arms to a position parallel to the floor when the tub 200 is tilted. Accordingly, the user may withdraw from and put the laundry in the drum 300 without hurting his/her waist or back by tilting the tub 200.

The control unit 600 may control the tilting driving member 400 so that the tub 200 is restored to an original position before tilting, when actuation of the rotary driving member 350 is detected, the user presses a command button on a user interface (not shown), the door is closed, or after a predetermined time interval passes. Accordingly, the drum 300 may be rotated by the rotary driving member 350 with the tub 200 at an original position (e.g., parallel to the floor or base 110 of the housing 100) while washing and spin-drying the laundry.

The original position may be a position at which center lines of the cylindrical drum 300 and tub 200 are parallel to one surface of the base 110. Alternatively, when the cylindrical drum 300 and tub 200 face unidirectionally, the original position may be a position before tilting the tub 200.

The tilting driving member 400 according to one or more exemplary embodiments of the present disclosure may be extended by internal fluid (e.g., hydraulic) pressure. Thus, in one embodiment, the tilting driving member 400 may comprise a hydraulic cylinder or piston.

One end of the tilting driving member 400 is connected (e.g., pivotally connected) to an outer peripheral surface of the tub 200 (e.g., at its lowermost position), and an opposite end of the tilting driving member 400 is supported by the housing 100 (e.g., by the base 110), and as a result, driving force may be provided to tilt, move or lift the tub 200 by extending the one end of the tilting driving member 400.

In detail, the tilting driving member 400 may provide a linear motion extending the tilting driving member 400 by the internal fluid (e.g., hydraulic) pressure within the tilting driving member 400.

That is, when the tilting driving member 400 presses or lifts the outer peripheral surface of the tub 200, the tub 200 may tilt in the direction in which the opening 210 of the tub 200 faces upward. Alternatively, the tilting driving member 400 may be pivotally connected to the rear end of the tub 200 (away from the door 120), and may lower the rear end of the tub 200 to tilt the front end (including the opening 210) upward. In such an embodiment, the auxiliary support member may be modified to enable the rear end of the tub 200 to go down. For example, the housing rib 720 may be shortened, and the tub rib 710 may be pivotally connected to a rear-facing end of the housing rib 720. Hydraulic cylinders or pistons that contract to move an object, rather than expand, are well known in the art.

Accordingly, the tilting driving member 400 may rapidly control the tilting of the tub 200 by internal fluid (e.g., hydraulic) pressure.

The damping members 510 and 520 according to exemplary embodiments of the present disclosure may include first damping portions 511 and 521, second damping portions 513 and 523, and hinges 512 and 522.

The first damping portions 511 and 521 may be coupled (e.g., pivotally coupled) with the outer peripheral surface (e.g., a side wall outer surface) of the tub 200. That is, the first damping portions 511 and 521 are coupled to the tub 200, and are compressed or extended by the vibrations from the tub 200 to perform a damping action.

In detail, the first damping portions 511 and 521 are pivotally coupled with the outer peripheral surface of the tub 200 to dampen vertical vibration of the tub 200.

The second damping portions 513 and 523 may be coupled (e.g., pivotally coupled) with the housing 100. In one embodiment, the second damping portions 513 and 523 may be pivotally coupled with the base 110 of the housing 100.

In detail, the second damping portions 513 and 523 are pivotally coupled with the base 110 to dampen vibrations in one or more directions other than the direction in which the first damping portions 511 and 521 dampen the vibrations. That is, the second damping portions 513 and 523 may be aligned longitudinally (e.g., in a left-to-right direction of the tub 200, or vice versa) and/or along a central direction of the tub 200 (e.g., in a front-to-back direction) to dampen forward-backward and/or rightward-leftward vibrations of the tub 200.

The hinges 512 and 522 may be coupled so that the first damping portions 511 and 521 and the second damping portions 513 and 523 are folded with respect to each other.

In detail, ends of the first damping portions 511 and 521 are pivotally coupled to the tub 200, and other (e.g., opposite) ends of the first damping portions 511 and 521 are coupled to the hinges 512 and 522. Ends of the second damping portions 513 and 523 are coupled to the hinges 512 and 522, and other (e.g., opposite) ends of the second damping portions 513 and 523 are pivotally coupled to the base 110.

Accordingly, the damping members 510 and 520 including the first damping portions 511 and 521, the second damping portions 513 and 523, and the hinges 512 and 522 perform one or more damping roles or functions by the damping action of the first damping portions 511 and 521 and the second damping portions 513 and 523, and may be folded and their positions and/or folding angles varied when the tub 200 is tilted because the first damping portions 511 and 521 and the second damping portions 513 and 523 are foldably coupled by the hinge portions 512 and 522.

The damping members 510 and 520 of the drum type washing machine 101 according to exemplary embodiments of the present disclosure may be formed in plural.

Plural damping members (e.g., 510 and 520) stably support the tub 200. In detail, the damping members 510 and 520 may be paced apart from each other around (e.g., on opposite sides of) the tilting driving member 400.

That is, the damping members 510 and 520 may be connected to the underside of the tub 200 on opposite sides of the tilting driving member 400 that presses, raises or lifts one side of the cylindrical tub 200 adjacent to the opening 210 (e.g., the front side of the tub 200) to tilt the tub 200. In a further embodiment, there may be four such folding damping members, two on opposite sides of the tilting driving member 400 on the front side or end of the tub 200, and two on opposite sides of the central axis of the tub 200 on the rear side or end of the tub 200.

Accordingly, the plurality of damping members 510 and 520 may effectively support the tub 200. The plurality of damping members 510 and 520 may be on one side of the tilting driving member 400 (e.g., on the front side or end of the tub 200), spaced apart from each other and operating in a direction in which the length of the tilting driving member 400 extends or contracts so that the plurality of damping members 510 and 520 may dampen vibrations generated when the tub 200 is tilted in the direction in which the opening 210 of the tub 200 is restored to its original position.

Figure 2:
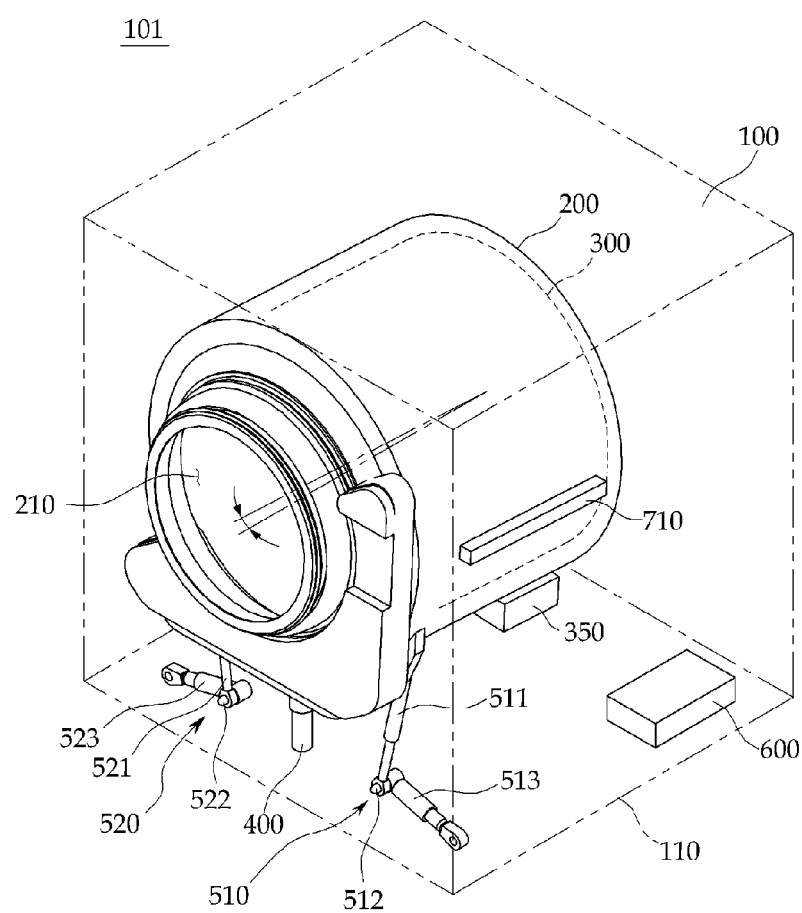
FIG. 2 is a diagram illustrating the drum type washing machine of FIG. 1 in which the tub is tilted.

As illustrated in FIG. 2, the plurality of hinges 512 and 522 of the damping members 510 and 520 according to one or more exemplary embodiments of the present disclosure may be away from each other (e.g., when the tub 200 is tilted in the direction in which the opening 210 faces upward).

The first damping portions 511 and 521 may dampen the vertical vibrations of or transferred to the tub 200. The second damping portions 513 and 523 may dampen the horizontal vibrations of or transferred to the tub 200.

When the first damping portions 511 and 521 dampen vertical vibrations and the second damping portions 513 and 523 dampen horizontal vibrations, the hinges 512 and 522 may move in a direction away from each other (e.g., when the tub 200 tilts in the direction in which the opening 210 of the tub 200 faces upward).

Accordingly, the first damping portions 511 and 521 and the second damping portions 513 and 523 dampen vibrations in different directions, and the folded first damping portions 511 and 521 and second damping portions 513 and 523 may expand or compress as the tub 200 tilts in the direction in which the opening 210 of the tub 200 faces upward.

When the tub 200 is restored to the original position, the first damping portions 511 and 521 and the second damping portions 513 and 523 are folded, and may protect the tub 200 from vibrations in different directions.

Accordingly, when the tub 200 tilts in the direction in which the opening 210 of the tub 200 faces upward, the hinges 512 and 522 of the damping members 510 and 520 move in the direction in which the hinges 512 and 522 are away from each other, and the first damping portions 511 and 521 and the second damping portions 513 and 523 may expand in a direction in which the first damping portions 511 and 521 and the second damping portions 513 and 523 are away from the base 110. When the tub 200 is restored to the original direction, the hinges 512 and 522 move in a direction closer to each other, and the first damping portions 511 and 521 and the second damping portions 513 and 523 may move in a direction in which the first damping portions 511 and 521 and the second damping portions 513 and 523 are close to the base 110.

Therefore, the first damping portions 511 and 521 and the second damping portions 513 and 523 are foldably coupled by the hinges 512 and 522 and fold or unfold when tilting the tub 200, and as a result, the damping members 510 and 520 may be installed in a compact space as compared with a case in which the damping member linearly expands and compresses.

Figure 3:
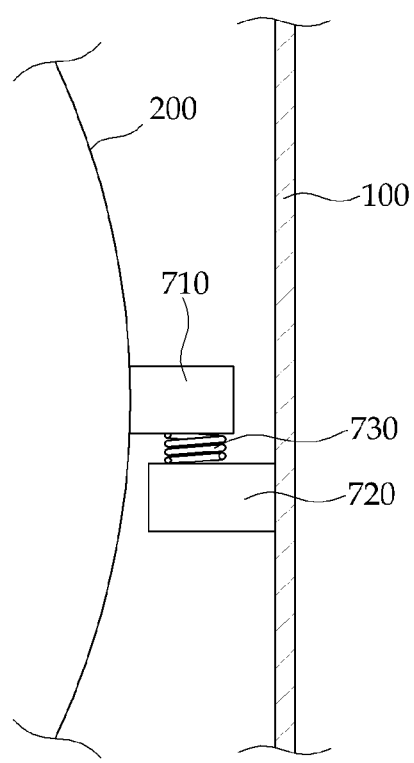
FIG. 3 is a cross-sectional view of an exemplary auxiliary damping member in the drum type washing machine of FIG. 1.

As illustrated in FIG. 3, the drum type washing machine 101 according to exemplary embodiments of the present disclosure may further include an auxiliary damping member 700 including a tub rib 710, a housing rib 720, and an elastic member 730.

The tub rib 710 may extend or protrude from the outer peripheral surface of the tub 200. That is, the tub rib 710 is on the outer peripheral surface of the tub 200 and extends in the longitudinal direction of the tub 200.

The housing rib 720 has one surface (e.g., an upper most surface) that faces one surface (e.g., a lowermost surface) of the tub rib 710, and may be inside the housing 100. That is, the housing rib 720 is inside the housing 100 and has one surface which faces one surface of the tub rib 710.

The elastic member 730 may be provided between the one surface of the tub rib 710 and the one surface of the housing rib 720. The elastic member 730 is between the tub rib 710 and the housing rib 720, and may dampen impact(s) between the tub rib 710 and the housing rib 720.

In detail, when the tub 200 tilts so that the opening 210 of the tub 200 faces upward, the elastic member 730 connected to the one surface of the housing rib 720 extends, and when the tub 200 is restored to the original position, the elastic member 730 is compressed by the tub rib 710.

Accordingly, the elastic member 730 may dampen the impact of the tub 200 which may be generated when the tub 200 tilts upward and thereafter is restored to the original position again. The elastic member 730 may also dampen the vibrations generated when the drum 300 rotates by assisting the damping members 510 and 520.

As one example, the elastic member 730 may be a compression spring.

The elastic member 730 according to various exemplary embodiments of the present disclosure is not limited to the disclosed example, and may be changed to various structures known to those skilled in the art. Alternatively, the elastic member 730 may be completely absent when the housing rib 720 is made of a strong, compressible material such as polyurethane foam on a horizontal surface of an L-bracket attach to the side wall of the housing 100.

The auxiliary damping member 700 according to exemplary embodiments of the present disclosure may be formed on each side (e.g., the left and right sides) of the tub 200 and/or the tub the tilting driving member 400.

By such a configuration, in the drum type washing machine 101 according to exemplary embodiments of the present disclosure, the tub 200 may be effectively tilted to reduce a user's fatigue degree and/or pain at the time of putting the laundry into the drum 300 and taking the laundry from the drum 300.

Hereinafter, a drum type washing machine 102 according to one or more additional exemplary embodiments of the present disclosure will be described with reference to FIGS. 4 and 5. Components of the drum type washing machine according to the additional exemplary embodiments are the same as those according to other exemplary embodiments, except for a door 120 and possibly the control unit 600.

Figure 4:
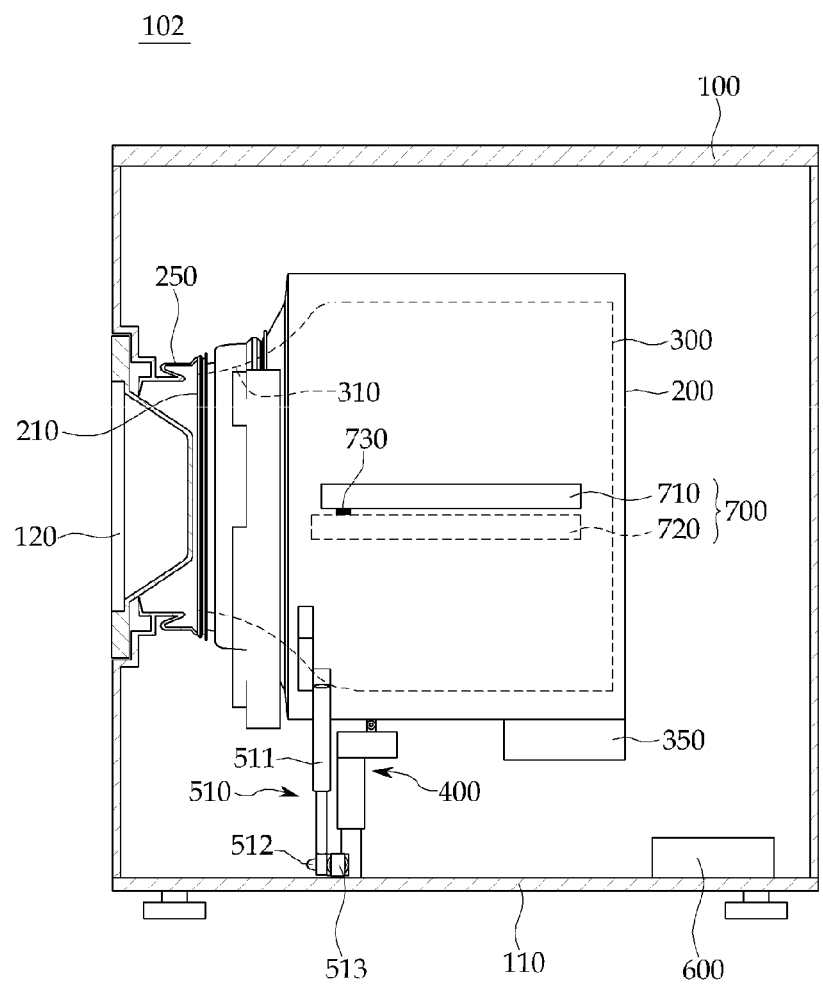
FIG. 4 is a side view illustrating a drum type washing machine according to one or more further exemplary embodiments of the present disclosure.

As illustrated in FIG. 4, the drum type washing machine 102 according to exemplary embodiments of the present disclosure includes a housing 100, a tub 200, the door 120, a tilting driving member 400, an elastic member 730, and the control unit 600.

The housing 100 forms an exterior of the drum type washing machine 102. Components for operating the drum type washing machine 102 are installed in the housing 100.

The tub 200 is positioned in the housing 100. Washing water is supplied to the tub 200 by a water supply device (not illustrated), and the tub 200 contains the washing water.

In detail, the tub 200 may have a cylindrical and/or slightly conical shape, and the opening 210 is at one side or end (e.g., a front side or end, nearest to the door 120).

The drum 300 is in the tub 200. The drum 300 may have a cylindrical or slightly conical shape to receive laundry. In detail, a drum opening 310 which faces the opening 210 of the tub 200 may be in the drum 300, and the tub 200 may have a central axis the same as or similar to the center axis of the cylindrical tub 200.

That is, the drum 300 is positioned in the cylindrical tub 200 and may have a cylindrical shape in which the drum opening 310 receives the laundry therein. In detail, the drum opening 310 may have a circular shape having the same center axis as the opening 210 of the tub 200.

The door 120 is provided at one side of the housing 100 to face and/or cover the opening 210 of the tub 200. In detail, the door 120 opens one side of the housing 100 to allow the laundry to be input and drawn through the drum opening 310.

The door 120 may be coupled to the housing using one or more hinges, or the door 120 may slide along one or more rails coupled to the front of the housing 100 to open and close one side of the housing 100.

The rotary driving member 350 is provided inside the housing 100 to provide motive power and/or to rotate the drum 300.

In detail, the rotary driving member 350 is installed at one side of the tub 200 and may transfer rotary force to the drum 300 through motive power transfer members such as a pulley and a belt (not illustrated) to rotate the drum 300.

As one example, the rotary driving member 350 may be a motor.

The tilting driving member 400 is provided between one side of the tub 200 and the housing 100 to provide motive power to tilt the tub 200. That is, the tilting driving member 400 is on a base 110 of the housing 100 supporting the drum type washing machine 102 to provide the motive power to tilt the tub 200.

In detail, the tilting driving member 400 is between an outer peripheral surface of the tub 200 and the base 110, and may be eccentrically adjacent to the opening 210 of the tub 200. That is, the tilting driving member 400 presses, pushes against or lifts one side (e.g., an underside or lowermost surface) of the cylindrical tub 200 at a location near or adjacent to the opening 210 to tilt the tub 200.

The elastic member 730 is provided between one side of the tub 200 and the housing 100, and dampens an impact from the tub 200 that is transferred to the housing 100 when the tilted tub 200 returns to its original, horizontal position. The damping members 510 and 520 according to exemplary embodiments of the present disclosure vary their positions and/or folding angles during tilting of the tub 200 by the tilting driving member 400.

That is, the damping members 510 and 520 may prevent the tub 200 from being damaged or broken due to vibrations generated when washing or spin-drying, in which the drum 300 is rotated by the rotary driving member 350, that are transferred to the tub 200.

When the vibrations generated by the rotation of the drum 300 are transferred to the tub 200, the damping members 510 and 520 dampen vibrations between the housing 100 and the tub 200 to prevent movement of the washing machine 102 and/or noise from being generated. Accordingly, the damping members 510 and 520 may improve the life-span of the drum type washing machine 102.

The positions and/or folding angles of the damping members 510 and 520 may vary when the tub 200 is tilted by the tilting driving member 400 to effectively support the tub 200. That is, the damping members 510 and 520 effectively support the tub 200 and may have effectively variable positions and/or folding angles during tilting of the tub 200.

In detail, the damping members 510 and 520 extend in the tilting direction when the tub 200 is tilted, and the lengths and/or folding angles of the damping members 510 and 520 may vary according to the tilting angle.

The control unit 600 detects opening of the door 120 and/or when the door 120 is open. The control unit 600 may control the tilting driving member 400 to tilt the tub 200 and/or the opening 210 of the tub 200 upward. In detail, the opening of the door 120 may be detected by a locking device (not illustrated) in the door 120 and/or in or behind the front panel of the housing 100.

Therefore, when the user opens the door 120 (e.g., in order to remove the laundry), the user may easily reach the laundry in the drum 300 when the opening 210 is tilted upward by the control unit 600. When the door 120 is closed by the user, the control unit 600 detects the closed door and returns the tub 200 to its original horizontal position (e.g., before tilting the tub again).

Figure 5:
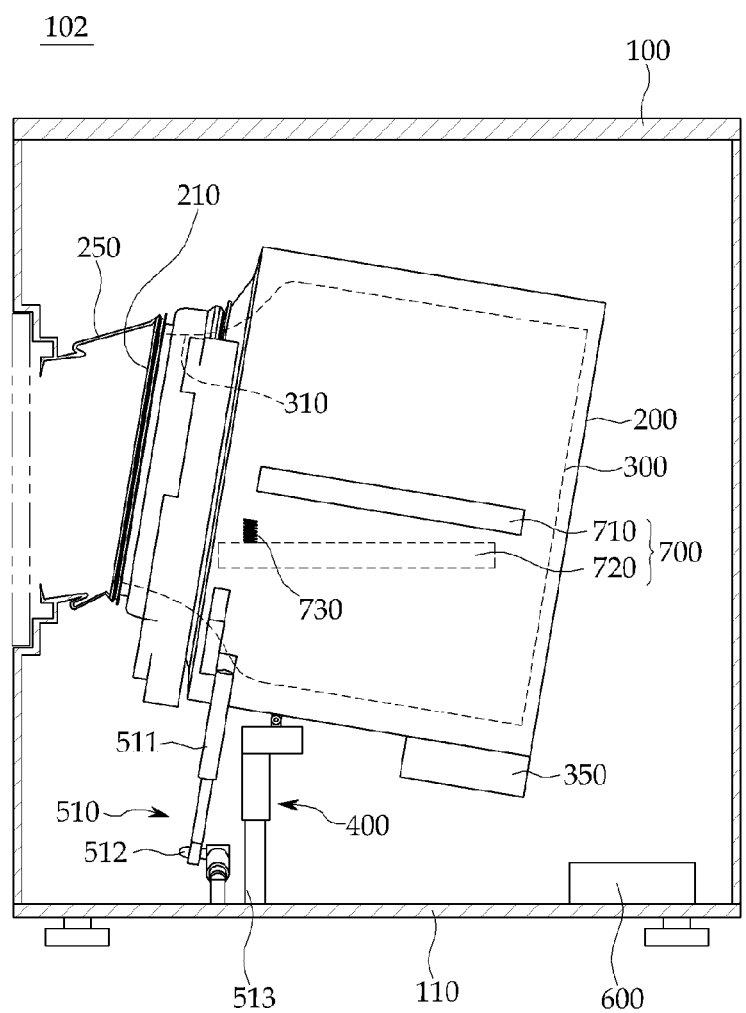
FIG. 5 is a side view illustrating the drum type washing machine of FIG. 4 in which the tub is tilted.

As illustrated in FIG. 5, when the user opens the door 120 in order to withdraw or remove laundry (e.g., after washing is completed), the user may easily remove the laundry from the drum 300 when the tub 200 is tilted (e.g., the opening 210 faces upward) by the control unit 600.

The drum type washing machine 102 according to exemplary embodiments of the present disclosure may further include a watertight member 250.

The watertight member 250 is between one side of the housing 100 (with the door 120 thereon) and the opening 210 in the tub 200. In detail, the watertight member 250 may prevent the water in the tub 200 from leaking into the housing 100 when the drum 300 rotates. The position and/or connection angle(s) of the watertight member 250 may vary by tilting the tub 200. The watertight member 250 may guide the user when the door 120 is open to withdraw the laundry from the drum 300 and put the laundry into the drum 300 without the laundry or any moisture therefrom falling into or becoming caught in the space between the opening 210 of the drum and the housing.

By such a configuration, in the drum type washing machine 102 according to exemplary embodiments of the present disclosure, the tub 200 may be effectively tilted when the door 120 is open to reduce a user's fatigue degree and/or reduce or minimize the user's back pain at the time of putting the laundry in and removing the laundry from the drum 300.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

What is claimed is:

1. A drum type washing machine, comprising:
a housing;
a tub in the housing and having an opening;
a drum in the tub;
a rotary driving member in the housing configured to rotate the drum;
a tilting driving member between a side wall of the tub and the housing, configured to provide motive power to an end of the tub and/or to tilt the tub;
one or more damping members between the side wall of the tub and the housing that support the tub and are varied by tilting the tub; and
a control unit configured to detect actuation of the rotary driving member and/or rotation of the drum, and control the tilting driving member to tilt the opening of the tub upward when the rotary driving member is not actuated and/or the drum is not rotating.

2. The drum type washing machine of claim 1, wherein the tilting driving member is between a lowermost surface of the tub and a floor of the housing, and is configured to tilt the opening of the tub upward.

3. The drum type washing machine of claim 2, wherein the tilting driving member contacts a front part of the tub nearest to the opening, and is configured to move or push the front part of the tub up.

4. The drum type washing machine of claim 1, wherein the tilting driving member has one end connected to an outer peripheral surface of the tub and another end on the housing, and the tilting driving member comprises a hydraulic piston or cylinder.

5. The drum type washing machine of claim 1, wherein the damping member includes:
a first damping portion coupled to the outer peripheral surface of the tub;
a second damping portion coupled to the housing; and
a hinge portion foldably or pivotally coupling the first damping portion and the second damping portion.

6. The drum type washing machine of claim 5, comprising a plurality of damping members on opposite sides of the tilting driving member.

7. The drum type washing machine of claim 6, wherein the hinge portion of each damping member is away from the tilting driving member and/or the damping member(s) on the opposite side of the tilting driving member.

8. The drum type washing machine of claim 1, further comprising an auxiliary damping member that includes:
a tub rib on an outer peripheral surface of the tub;
a housing rib inside the housing, facing one surface of the tub rib; and
an elastic member between the tub rib and the housing rib.

9. A drum type washing machine, comprising:
a housing;
a tub in the housing and having an opening;
a drum in the tub;
a door over and/or facing the opening, at one side of the housing;
a tilting driving member between the tub and the housing, configured to provide motive power to an end of the tub and/or to tilt the tub;
one or more damping members between the tub and the housing that supports the tub and are varied by tilting the tub; and
a control unit configured to detect when the door is open, and control the tilting driving member to tilt the opening of the tub upward when the door is open, wherein the tilting driving member has one end pivotally connected to an outer peripheral surface of the tub and another end on the housing, and the one end of the tilting driving member is extended by internal fluid pressure.

10. The drum type washing machine of claim 9, wherein the tilting driving member is between a lowermost surface of the tub and a floor of the housing, contacts a front part of the tub nearest to the opening, and is configured to move or push the front part of the tub up.

11. The drum type washing machine of claim 9, wherein the damping member includes:
a first damping portion pivotally coupled to the outer peripheral surface of the tub;
a second damping portion pivotally coupled to the housing; and
a hinge foldably or pivotally coupling the first damping portion and the second damping portion.

12. The drum type washing machine of claim 11, comprising a plurality of damping members on opposite sides of the tilting driving member.

13. The drum type washing machine of claim 12, wherein the hinge of each damping member is away from the tilting driving member and/or the damping member(s) on the opposite side of the tilting driving member.

14. The drum type washing machine of claim 12, wherein the hinge portion of each damping member is away from the tilting driving member and/or the damping member(s) on the opposite side of the tilting driving member when the opening of the tub is tilted upward.

15. The drum type washing machine of claim 9, further comprising an auxiliary damping member that includes:
a tub rib on an outer peripheral surface of the tub;
a housing rib inside the housing, facing one surface of the tub rib; and
an elastic member between the tub rib and the housing rib.

16. A method of tilting a drum type washing machine, comprising:
confirming that a drum in a tub in a housing of the drum type washing machine is not rotating and/or a door over an opening of the tub at one side of the housing is open;
tilting the tub so that the opening of the tub faces upward using a tilting driving member between the tub and the housing when the drum is not rotating and/or the door is open; and
varying a position of one or more damping members between the tub and the housing that supports the tub when tilting the tub,
comprising confirming that the drum is not rotating, wherein the tilting driving member is between a lowermost surface of the tub and a floor of the housing and contacts a front part of the tub nearest to the opening, and the tilting driving member moves or pushes the front part of the tub up when the drum is not rotating.

17. The method of claim 16, comprising confirming that the door is open, wherein the tilting driving member is between a lowermost surface of the tub and a floor of the housing and contacts a front part of the tub nearest to the opening, and the tilting driving member moves or pushes a front end of the tub nearest to the opening up when the door is open.

* * * * *